US009667517B2

(12) United States Patent
Ling et al.

(10) Patent No.: US 9,667,517 B2
(45) Date of Patent: May 30, 2017

(54) METHOD AND APPARATUS FOR CHECKING CONNECTION OF BI-DIRECTIONAL LSP (71) Applicant: Alcatel Lucent, Boulogne-Billancourt (FR)

(72) Inventors: Hui Ling, Shanghai (CN); Haibo Wen, Shanghai (CN); Zheng Liang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 26 days.

(21) Appl. No.: 14/433,813

(22) PCT Filed: Nov. 18, 2013

(86) PCT No.: PCT/IB2013/002728
§ 371 (c)(1),
(2) Date: Apr. 6, 2015

(87) PCT Pub. No.: WO2014/080276
PCT Pub. Date: May 30, 2014

(65) Prior Publication Data
US 2015/0281021 A1    Oct. 1, 2015

(30) Foreign Application Priority Data
Nov. 23, 2012  (CN) .......................... 2012 1 0483340

(51) Int. Cl.
*H04L 12/26*    (2006.01)
*H04L 12/723*   (2013.01)
(Continued)

(52) U.S. Cl.
CPC .......... *H04L 43/0811* (2013.01); *H04L 45/50* (2013.01); *H04L 45/24* (2013.01); *H04L 45/28* (2013.01)

(58) Field of Classification Search
None
See application file for complete search history.

(56) References Cited

U.S. PATENT DOCUMENTS

| 7,937,492 B1* | 5/2011 | Kompella | H04L 45/22 370/351 |
| 2007/0177523 A1* | 8/2007 | Nagami | H04L 12/2602 370/252 |
| 2009/0086644 A1* | 4/2009 | Kompella | H04L 12/2697 370/248 |

FOREIGN PATENT DOCUMENTS

| CN | 101127765 A | 2/2008 |
| CN | 101599859 A | 12/2009 |

OTHER PUBLICATIONS

Chen Huawei N So Created Verizon V Hallivuori Tellabs M: "BFD for MPLS Lsps Enhancement; Draft-Chen-Mpls-Bfd-Enhancement-01.Txt", Internet Society (ISOC) 4, Rue Des Falaises Ch-1205 Geneva, Switzerland, Mar. 2010, pp. 1-10.
(Continued)

*Primary Examiner* — Christopher Crutchfield
*Assistant Examiner* — Tito Pham
(74) *Attorney, Agent, or Firm* — Harness, Dickey & Pierce, P.L.C.

(57) ABSTRACT

A method for checking connectivity between a first device and a second device on a bidirectional Label Switched Path LSP, includes the first device sends, to the second device, an echo request including a reply mode and a return address, the reply mode requesting an echo reply to be delivered through backward LSP, and the return address being the unique ID of the first device; the first device receives an echo reply from the second device, the echo reply including the unique ID of the first device and return code related to connectivity of the backward LSP; and the first device correlates the echo reply with the echo request to verify
(Continued)

connectivity between the two devices on the bidirectional Label Switched Paths.

7 Claims, 6 Drawing Sheets

(51) Int. Cl.
    *H04L 12/707*     (2013.01)
    *H04L 12/703*     (2013.01)

(56)            References Cited

OTHER PUBLICATIONS

Chen W Cao Huawei Technologies Co M, et al.: "Return Path Specified LSP Ping; draft-ietf-mpls-return-path-specified-Isp-ping-11.txt", Return Path Specified Lsp Ping; Draft-Ietf-Mpls-Return-Path-Specified-Lsp- Ping-11.Txt, Internet Engineering Task Force, Ietf; Standardworkingdraft, Internet Society (Isoc) 4, Rue Des Falaises Ch- 1205 Geneva, Switzerland, Oct. 2012, pp. 1-21.
International Search Report PCT/ISA/210 for International Application No. PCT/IB2013/002728 Dated Apr. 30, 2014.

\* cited by examiner

METHOD AND APPARATUS FOR CHECKING CONNECTION OF BI-DIRECTIONAL LSP

FIELD OF THE INVENTION

This invention relates to a communication network, more particularly, a method and apparatus for detecting connectivity of a bidirectional Label Switched Path (LSP) in the multiple-protocol label switching (MPLS) network.

BACKGROUND OF THE INVENTION

Multiple-protocol label switching (MPLS) is a system for rapid data packet exchange and routing, which provides capabilities, such as, targeting, routing, forwarding, exchanging and the like to network data traffic. It provides a mode for mapping IP address into a simple label having a fixed length, for use in different packets forwarding and exchanging techniques. In the MPLS network, the node, switcher or router supporting the MPLS are generally termed as Label Switched Router (LSR) and the LSR at the edge (ingress or egress) of the MPLS network is generally termed as Label Edge Router (LER). MPLS, as a classification forwarding technique, classifies groups having the same forward processing way into one class, called Forwarding Equivalence Class (FEC). The groups with the same forwarding equivalence class shall be processed in the same way in the MPLS network. The path passed through by one forwarding equivalence class in the MPLS network is termed as Label Switched Path (LSP).

MPLS LSP ping has been introduced into MPLS network as a simple yet efficient mechanism to detect data plane failure in multiple-protocol label switching (MPLS) Label Switched Paths (LSPs) (see details in RFC4379 "Detecting Multiple-Protocol Label Switched (MPLS) Data Plane Failures", February, 2006). The basic idea is to verify that packets that belong to a particular Forwarding Equivalence Class (FEC) actually end their MPLS path on a Label Switching Router (LSR) that is an egress for that FEC. This test can be carried out by sending a packet (called an "MPLS echo request") along the same data path as other packets belonging to this FEC. MPLS echo request also carries information about FEC. MPLS path of the FEC is being verified. This echo request is forwarded just like any other packet belonging to that FEC. In "ping" mode (basic connectivity check), the packet should reach the end of the path, at which point it is sent to the control plane of the egress LSR, which then verifies whether it is indeed an egress for the FEC (see details in RFC4379 mentioned above).

The initial proposal of LSP Ping mechanism is intended for unidirectional LSP check. LSPs, however, are increasingly being deployed to provide bidirectional services. The co-routed bidirectional LSP is defined in RFC3471 "Generalized Multiple-Protocol Label Switching (GMPLS) Signaling Functional Description" (January, 2003) and RFC3473 "Generalized Multiple-protocol label switching (GMPLS) signaling resource reservation protocol-Traffic engineering (RSVP-TE) extensions (January, 2003), and the associated bidirectional LSP is defined in RFC5645 "Requirement of an MPLS Transport Profile" (September, 2009)". With the deployment of such services, operators have a desire to test both directions of a bidirectional LSP in a single operation.

Furthermore, an LSP such as multi-segment pseudo-wire (MS-PW) can span across multiple service provider networks. In order to allow service providers to verify segments of such MS-PW, any node along the path of the MS-PW, should be able to originate an LSP-Ping echo request packet to any other node along the path of the MS-PW and receive the corresponding echo reply. The LSP ping at intermediate LSR along bidirectional LSPs can be triggered at the LER by issuing remote command through out-of-band connectivity such as IP routes to the intermediate node or started directly by network administrator at the intermediate node in the LSP.

In summary, we need to extend the LSP Ping mechanism to not only support bidirectional LSP check in a single operation (including co-routed bidirectional LSPs and associated bidirectional LSPs), but also support LSP check from any intermediate node along the LSP to any other node in these bidirectional LSPs.

In RFC 4379, the LSP Ping echo request is sent as a UDP (User data Packet) data packet, which includes the initiator's routable IP address as source and a 127/8 address as destination to force the request not to be IP forwarded, but MPLS forwarded. The request once reaches its destination node, triggers an echo reply from the destination node. The destination node then sets the source address of the echo request as the destination IP address of its echo reply message and sends the reply back to the request initiator.

This original design, however, doesn't work for bidirectional LSPs because the echo reply also needs to be MPLS forwarded through the backward LSP, instead of through other routes, so that the backward LSP can be checked in one operation. With the existing LSP ping mechanism, operators have to enable LSP detection on each of the two ends of a bidirectional LSP independently. This not only doubles the workload for the operators, but also brings additional difficulties when checking the backward direction of the LSP under the following conditions:

1. The LSR that the operator logged on to perform the checking operations might not have out-of-band connectivity to the LSR at the far end of the LSP. That can mean it is not possible to check the return direction of a bidirectional LSP in a single operation. The operator must log on to the LSR at the other end of the LSP to test the return direction.

2. The LSP being tested might be an inter-domain/inter-AS LSP where the operator of one domain/AS may have no right to log on to the LSR at the other end of the LSP since this LSR resides in another domain/AS. That can make it completely impossible for the operator to check the return direction of a bidirectional LSP.

These issues apply to both co-routed bidirectional LSPs and associated bidirectional LSPs. (see IETF Draft "Return Path Specified LSP Ping", October, 2011).

The existing LSP Ping mechanism relies on the IPV4/6 destination address in the echo reply message and the IP route to deliver the reply back to the right LSP ping request initiator. This IP route and destination cannot be used any more when the LSP echo reply packet is MPLS forwarded. The MPLS forwarding makes it a challenge to deliver the echo Reply message back to the echo request initiator for any-to-any LSP ping over bidirectional LSPs.

In the existing LSP ping mechanism, a request packet being sent to the control plane for processing can be triggered by several conditions including: its MPLS TTL expires; the packet reaches a LER; router alert option; or IP TTL expiration. Measuring the hop distance from the echo request initiator to the reply node and then using this hop distance as MPLS TTL for the echo reply message may work for co-routed bidirectional LSPs (see IETF Draft "Definition of Time-to-Live TLV for LSP-Ping Mechanism", March, 2012), it won't work for associated bidirectional LSPs since the hop distance may differ in the two directions of LSPs. Therefore, we need to find a new way to ensure reply message reaches the right request initiator for all bidirectional LSPs.

Therefore, we need to seek a new method for all the bidirectional LSPs to ensure that reply messages reach right request initiators.

SUMMARY OF THE INVENTION

The present invention intends to extend LSP mechanism so as to support check of connectivity between any two nodes on a bidirectional LSP.

According to an aspect of the present invention, it provides a method for checking connectivity between a first device and a second device on a bidirectional Label Switched Path LSP, comprising: the first device sends, to the second device, an echo request including a reply mode and a return address, the reply mode requesting an echo reply to be delivered through backward LSP, and the return address being the unique ID of the first device; the first device receives an echo reply from the second device, the echo reply including the unique ID of the first device and return code related to connectivity of the backward LSP; and the first device correlates the echo reply with the echo request to verify connectivity between the two devices on the bidirectional LSP.

In an embodiment according to the present invention, the echo reply reaches the first device along the backward LSP if a backward LSP exists; and the echo reply reaches the first device along IP routes if the backward LSP does not exist or is broken.

In an embodiment according to the present invention, the echo request comprises TLV of a forward FEC and TLV of a backward FEC of the bidirectional LSP, the backward FEC is for identifying a backward LSP.

In an embodiment according to the present invention, if the first device is not on the path of the backward LSP, an end device of the backward LSP generates another echo reply including revised return code and forwards the other echo reply to the first device.

According to a second aspect of the present invention, it provides a method for checking connectivity between a first device and a second device on a bidirectional Label Switched Path LSP, comprising: the second device receives, from the first device, an echo request including a reply mode and a return address, the reply mode requesting an echo reply to be delivered through backward LSP, and the return address being the unique ID of the first device; the second device sends an echo reply to the first device, the echo reply including the return address and return code related to connectivity of the backward LSP, wherein, the echo reply is associated with the echo request to verify connectivity between the two devices on the bidirectional LSP.

According to a third aspect of the present invention, it provides an apparatus on a bidirectional Label Switched Path LSP, comprising: echo request sending module, being configured to send, to another device on the LSP, an echo request including a reply mode and a return address, the reply mode requesting an echo reply to be delivered through backward LSP, and the return address being the unique ID of the first device; echo request receiving module, being configured to receive an echo reply from the other device, the echo reply including the return address and return code related to connectivity of the backward LSP; and a request-reply associating module, being configured to correlate the echo reply with the echo request to verify connectivity of the bidirectional LSP.

In one of the embodiments according to the present invention, the backward LSP further includes an end device, and if the device is not on the path of the backward LSP, the end device is configured to generate another echo reply including revised return code and forwards the other echo reply to the device.

According to a fourth aspect of the present invention, it provides an apparatus on a bidirectional Label Switched Path LSP, comprising: echo request receiving module, being configured to receive, from another device on the LSP, an echo request including a reply mode and a return address, the reply mode requesting an echo reply to be delivered through backward LSP, and the return address being the unique ID of the first device; and echo request sending module, being configured to send, to the other device, an echo reply including the return address and return code related to connectivity of the backward LSP, wherein, the echo reply is associated with the echo request to verify connectivity between the device and the other device on the bidirectional LSP.

According to the preferred embodiments of the present application, the first device and the second device above are Label Switched Routers or Label Edge Routers on the LSP path, or any other network nodes having routing switched functions, the end device is for example, a Label Edge Router.

BRIEF DESCRIPTION OF THE DRAWINGS

From the detailed description in combination with figures, the further features and advantages of the embodiments of the present invention shall become obvious. In the said figures.

DETAILED DESCRIPTION OF THE ILLUSTRATIVE EMBODIMENTS

Various exemplary embodiments can be fully described by referring to the figures. It needs to be pointed out that the specific structures and functional details disclosed here are only for describing the exemplary embodiments. Exemplary embodiments can be presented in many optional forms and should not be considered to be limited to the embodiments described here. The following description specifically describes or demonstrates specific software, circuits, structures and techniques that have been used in the prior art to avoid their confusion with the present application; it should also be understood that although the terms, a first, a second in the text can be used here for describing various devices, these devices should not be restricted by these terms. These terms are only for distinguishing one device from another, for example, the first device can be termed as the second device and similarly, the second device can be termed as the first device without exceeding the range of exemplary embodiments.

Figure 1:
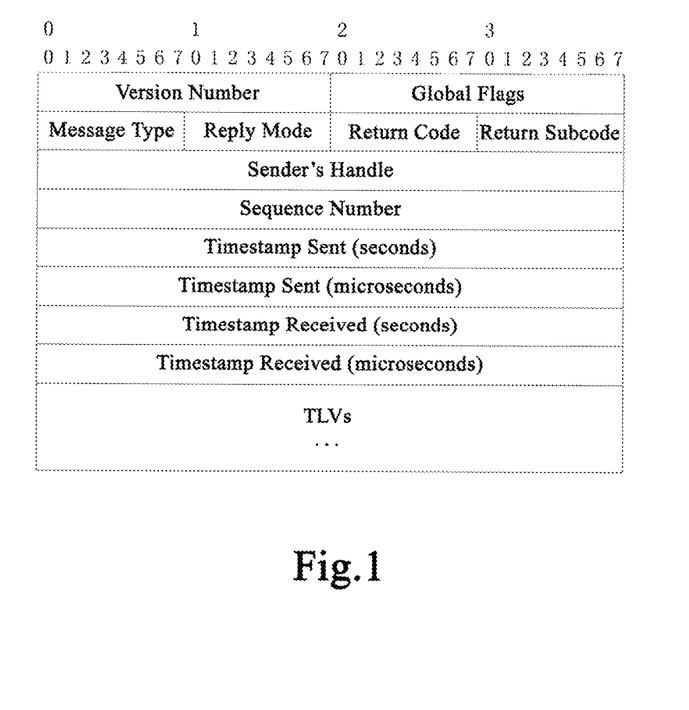
FIG. 1 shows UDP packet format for the echo request.

FIG. 1 provides echo request UDP packet format, and four reply modes are already defined in existing LSP Ping,
1: Do not reply,
2: Reply via an IPv4/6 UDP packet,
3: Reply via an IPV4/6 UDP packet with Router Alert,
4: Reply via application level control channel.

In the present application, we define a new mode, 5: Reply via backward LSP. This new mode is set for initiating bidirectional LSP checking. When this new reply mode is specified in the echo request, the echo reply must be sent over a backward LSP, instead of IP routes.

Figure 2:
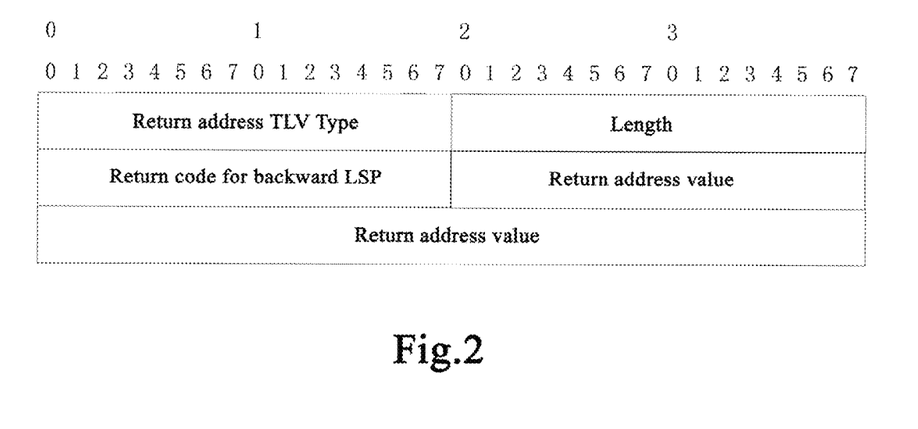
FIG. 2 shows the return address TLV defined in the echo request according to embodiments of the present invention.

To allow the receiving node of the echo request to correctly identify and deliver a reply to the LSP ping request initiator when the new reply mode is specified, we define a new return address TLV (Type-Length-Value). Furthermore, this TLV includes a return code for the backward LSP status report. The format of this new TLV is shown in FIG. 2. The type is two bytes in length, and its value is to be decided by IANA. The Length field is also two bytes in length. It defines the length in bytes of the address Value.

The return code has the following values shown by Table 1

TABLE 1

| Value | Meaning |
| --- | --- |
| 0 | No return code |
| 1 | Malformed return address TLV received |
| 2 | The echo reply was sent successfully over backward LSP |
| 3 | No backward LSP, echo reply sent via IP path |
| 4 | No backward LSP, echo reply sent via IP path |
| 5 | Backward LSP bypasses the request initiator, reply sent via backward LSP first and then forward LSP |
| 6 | Return address TLV not included in echo request, reply sent via IP path |

The address is the unique ID of the initiator which can be used to uniquely identify the request initiator, such as, IPV4/6 address. It is assumed that such unique ID is already available in an LSR, and is ready to be used in the new TLV.

Figure 3:
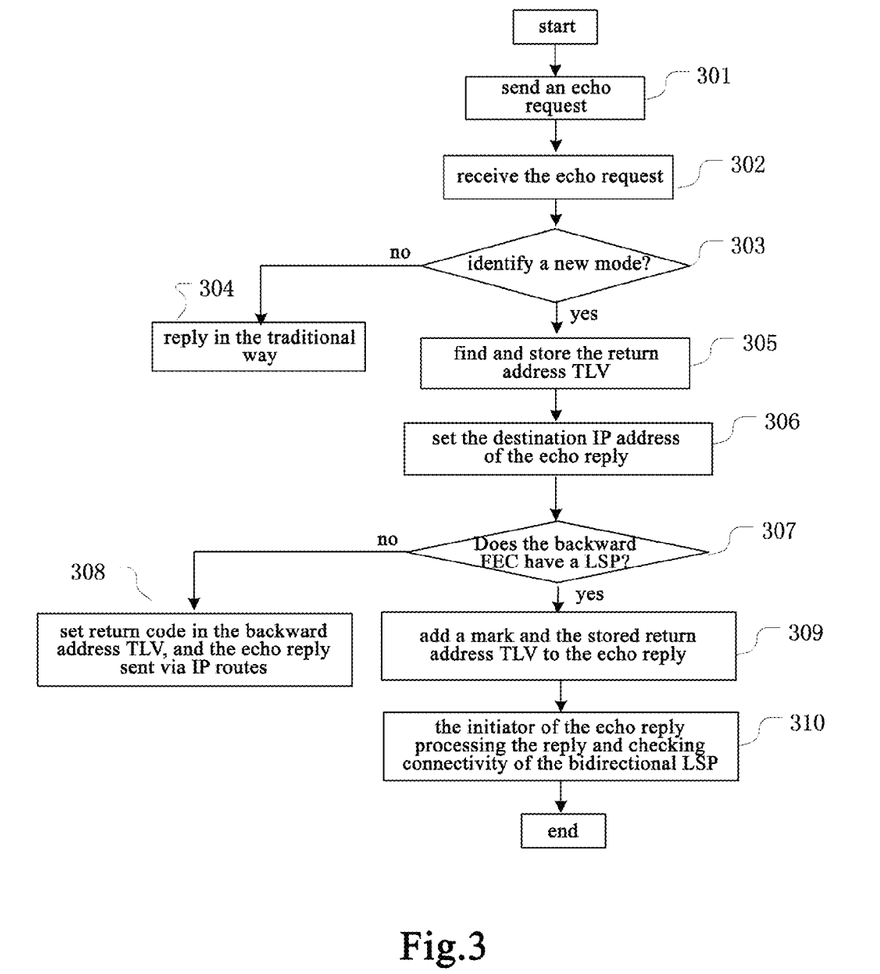
FIG. 3 shows an operational flowchart for checking connectivity of the bidirectional LSP according to embodiments of the present invention.

FIG. 3 is an operational flowchart for checking connectivity of the bidirectional LSP according to embodiments of the present invention. In combination with FIG. 3, the operational procedure according to embodiments of the present application shall be described as follows:

At step 301, when a node of the initiator wants to send a Ping request to test a bidirectional LSP, it sets the reply mode to be 5: reply via backward LSP, and adds a "Return address TLV" filed to the echo request with its IPv4/6 address, the return code is left blankly for reply node to fill in. The echo request includes FEC of the forward LSP and FEC of the backward LSP to be detected. The other fields are set using the rules and procedures defined in the prior art.

At step 302, the reply node (i.e., LSR) receives the request.

If the LSR doesn't know the new reply mode 5, at step 304, an echo reply with the return code set to be "Malformed echo request" and the sub code set to be zero will be sent back to the echo request initiator according to the rules of the prior art (i.e., RFC,4379). Otherwise, the replying LSR should find the return address TLV and save it, as shown at step 305.

At step 306, when the echo reply is intended to test the backward LSP via echo reply, the destination IP address of the echo reply message is set to be 127/8 for IPV4 or 0:0:0:0:0:FFFF:127/104 for IPV6 and the IP TTL is set to be 1 to prevent the message from being IP forwarded.

When sending the reply, the backward LSP is identified from the backward FEC (it is assumed that nodes know the pairing relationship between the forward FEC and backward FEC for the bidirectional LSPs. If not, another TLV for backward FEC similar to the forward FEC needs to be included in the echo request message). If no LSP exists for the backward FEC or the backward LSP is broken, then the return code in the return address TLV is set accordingly and the echo reply is sent over IP routes instead, as shown at step 308.

If an LSP does exist for the backward FEC, then the corresponding label is added into the echo reply message using the same way the forwarding LSP is added to the echo request. In addition, the saved return address TLV from the request is added to the reply message, and the return code is set accordingly, i.e., step 309.

Step 310 illustrates a procedure of receiving a reply. In the reply mode of embodiments according to the present application, a node determines if the reply is handled by itself by checking the return address TLV in the reply message.

If the return address value in the address TLV matches a node's advertised address in LSP, the node is the reply request initiator and then this reply is handled by this node without further forwarding. This method allows the echo request initiator to correctly intercept an echo reply message for processing regardless of where the initiator is in the LSP.

For co-routed bidirectional LSP, the echo reply will reach the echo request node if the backward LSP does not contain any data plane failure. For associated bidirectional LSPs, however, this echo reply may bypass the request initiator node. If the backward LSP does bypass the request initiator, the reply will reach the LER of the backward LSP, which can detect that the echo reply has missed the echo request node, and by forwarding the reply along the forward LSP, the reply can reach the request initiator if no data failure is detected. The echo request node can learn this special case from the return code in the return address TLV. The possible cases shall be continuously explained in the following examples.

It needs to be simply explained that in the present description, the co-routing refers to one that backward routing and forwarding routing pass through the same node. Otherwise, a routing is termed as an associated routing, e.g., in FIG. 4, the bidirectional LSP from R1 to R3 belongs to a co-routing LSP, and the bidirectional LSP from R3 to R5 belongs to an associated routing LSP.

Figure 4:
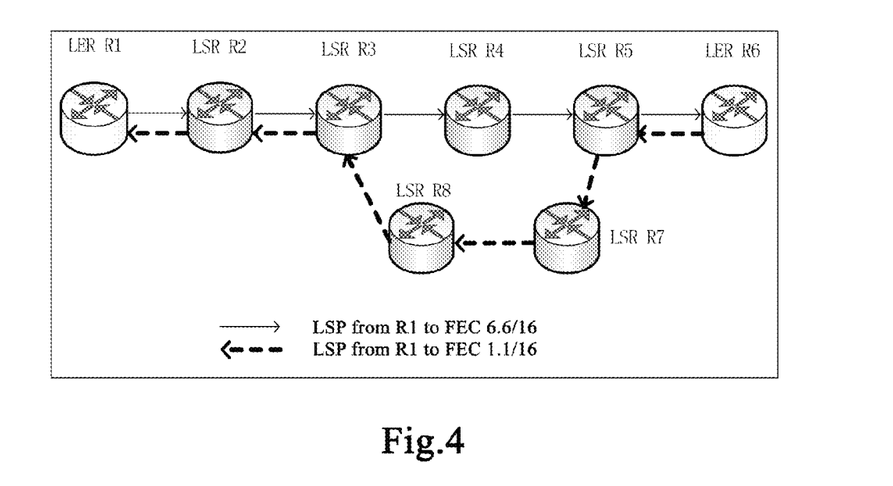
FIG. 4 shows an exemplary topology for associated bidirectional LSP.

FIG. 4 shows an exemplary topology for a bidirectional LSP.

Some of the forward and backward routings in associated bidirectional LSP shown in this example pass through the same node. Assuming IPV4 address 1.1/16 is learned at LER R1 and IPV4 address 6.6/16 is learned at LER R6, the LSP from R1 to R6 for FEC 6.6/16 is shown in full line and the backward LSP from R6 to R1 for FEC 1.1/16 is shown in dotted line. Next, we show how our proposed LSP Ping is used in the example topology in four different scenarios. In all scenarios, if the forward LSP encounters some data path failures, the corresponding return code/sub code is set using the procedure defined in the prior art and the echo reply message is sent back via IP routes.

Example 1

Detecting the Bidirectional LSP Between R1 and R3

Figure 5:
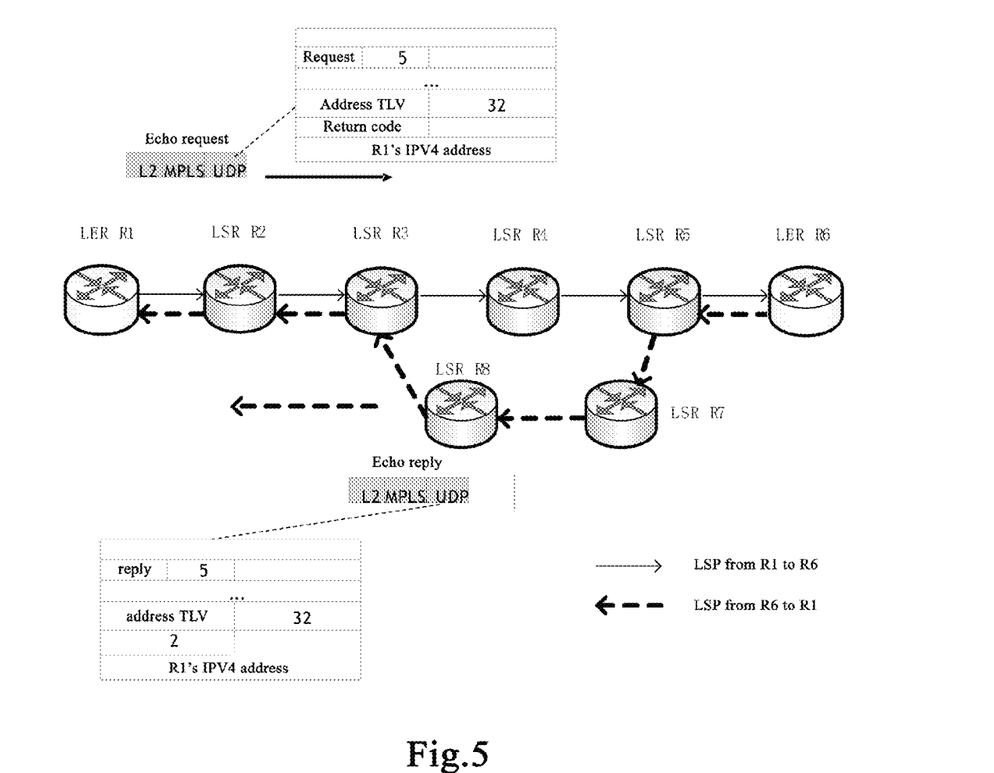
FIG. 5 shows a schematic diagram illustrating bidirectional LSP ping from R1 to R3 according to one of the embodiments.

The forwarding FEC is set to be 6.6/16 for the echo request and the backward FEC is set to be 1.1/16 for the echo reply. For the request to reach R3, the MPLS TTL is set to be 2 to ensure the echo request stops at LSR R3. The reply mode is set to be 5 reply via backward LSP, and the address TLV is set to be R1's IPV4 address R1.

After two MPLS forwarding, the request reaches R3, which finds the reply is intended to check the backward LSP for FEC 1.1/16. R3 then assembly an echo reply with IPV4 destination address 127/8 to prevent IPV4 forwarding and address TLV extracted from the echo request. The reply code is accordingly set to be 5: the echo reply was sent successfully over backward LSP.

After two label switching, the echo reply will reach LER R1, R1 finds that the echo reply is intended for itself by checking the address TLV. It then correlates this reply with the corresponding echo request and the original request completes with successful verification of the bidirectional LSP.

If any data plane failure occurs in the bidirectional LSP between R1 and R3, R1 will receive the echo reply via IP routes with corresponding return code in the return address TLV indicating errors if the IP connectivity is maintained. FIG. 5 shows partially the packet format for this case.

Example 2

Detecting the Bidirectional LSP Between R1 and R4

Figure 6:
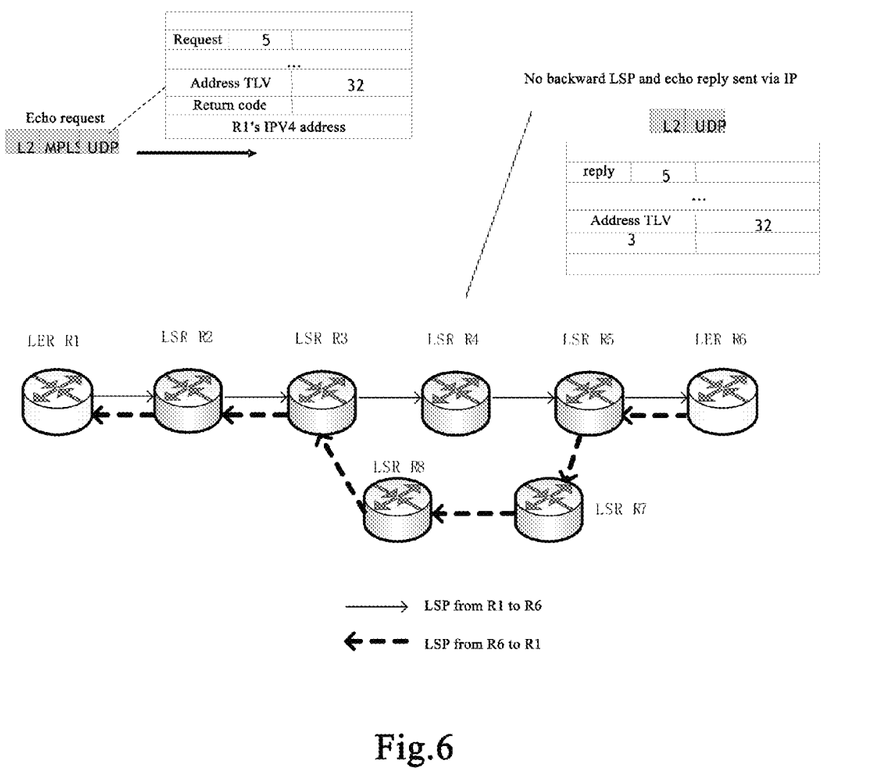
FIG. 6 shows a schematic diagram illustrating bidirectional LSP ping from R1 to R4 according to one of the embodiments.

The forwarding FEC is set to be 6.6/16 for the echo request and the backward FEC is set to be 1.1/16 for the echo reply. For the request to reach R4, the MPLS TTL is set to 3 to ensure the echo request stops at LSR R3. The reply mode is set to be 5 reply via backward LSP, and the address TLV is set to be R1's IPV4 address R1.

After three MPLS forwarding, the request reaches R4, which, however, does not have a LSP for this FEC since the backward LSP from R6 to R1 bypasses this router. Therefore, R4 won't be able to test backward LSP for the FEC. It then sets the return code in the return address TLV to be 3 indicating no backward LSP from the reply node and sends the echo reply via IP routes (see FIG. 1). FIG. 6 shows partially the packet format for this case.

Example 3

Detecting the Bidirectional LSP Between R3 and R5

Figure 7:
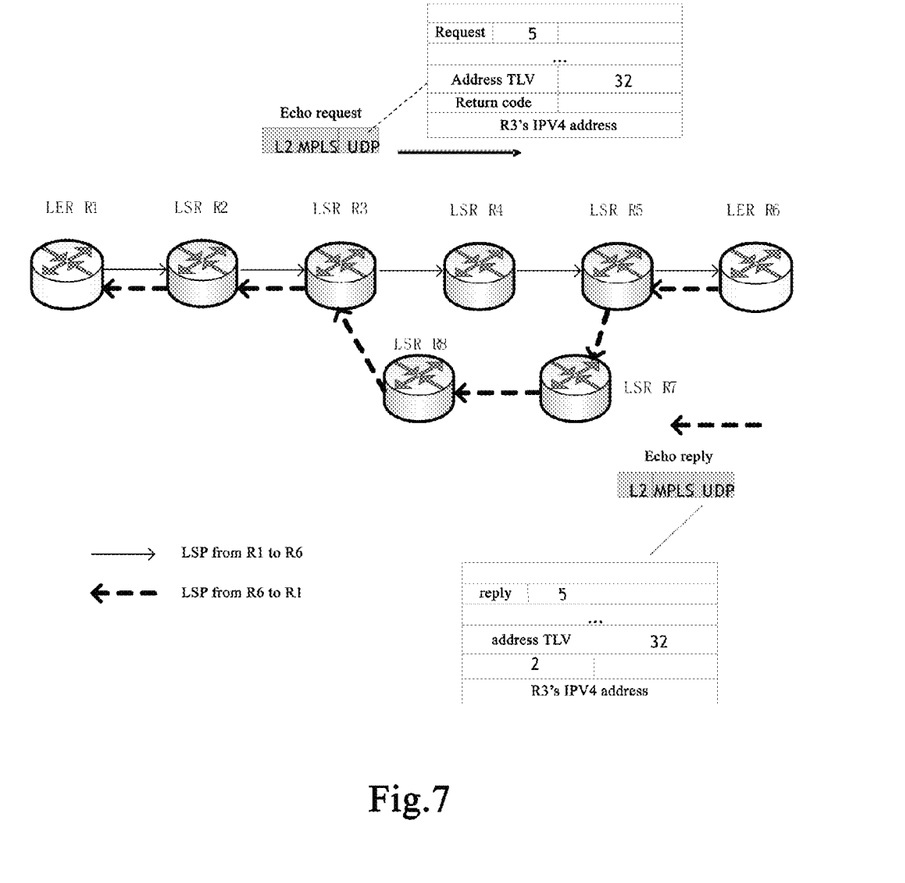
FIG. 7 shows a schematic diagram illustrating bidirectional LSP ping from R3 to R5 according to one of the embodiments.

The forwarding FEC is set to be 6.6/16 for the echo request and the backward FEC is set to be 1.1/16 for the echo reply. For the request to reach R5 from R3, the MPLS TTL is set to be 2 to ensure the echo request stops at LSR R5. The reply mode is set to 5: reply via backward LSP, and the address TLV is set to be R3's IPV4 address R3.

After two MPLS forwarding, the request reaches R5, which finds the reply is intended to check the backward LSP for FEC 1.1/16. It also finds that the backward LSP is an associated bidirectional LSP. The backward LSP goes through R7 and R8 to R3. R5 then assembly an echo reply message with IPV4 destination address 127/8 to prevent IPV4 forwarding and address TLV extracted from the echo request with return code set accordingly. In addition, the reply code is accordingly set to be 2: the echo reply was sent successfully over backward LSP.

After three MPLS forwarding, the echo reply will reach LSR R3, R3 finds that the echo reply is intended for itself by checking the address TLV. It then correlates this reply with the corresponding echo request and the original request completes with successful verification of the bidirectional LSP. FIG. 7 shows partially the packet format for this case.

Example 4

Detecting the Bidirectional LSP Between R4 and R5

Figure 8:
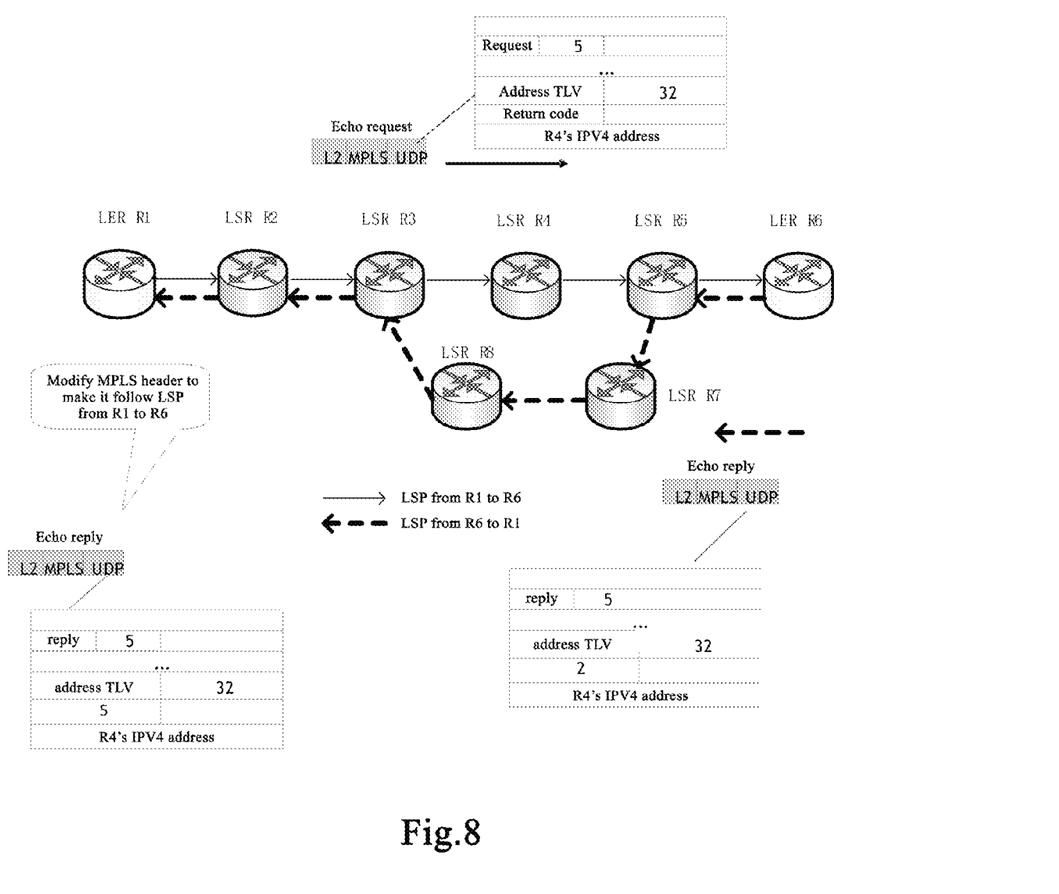
FIG. 8 shows a schematic diagram illustrating bidirectional LSP ping from R4 to R5 according to one of the embodiments.

The forwarding FEC is set to be 6.6/16 for the echo request and the backward FEC is set to be 1.1/16 for the echo reply. For the request to reach R5 from R4, the MPLS TTL is set to 1 to ensure the echo request stops at LSR R5. The reply mode is set to 5 reply via backward LSP, and the address TLV is set to be R3's IPV4 address: R3.

After one MPLS forwarding, the request reaches R5, which finds the reply is intended to check the backward LSP for FEC 1.1/16. It also finds that the backward LSP is an associated bidirectional LSP. The backward LSP goes through R7, R8, R3 and R2 to the end point of the LSP at R1. R5 then assembly an echo reply message with IPV4 destination address 127/8 to prevent IPV4 forwarding and address TLV extracted from the echo request with return code set accordingly. The reply is accordingly set with reply code.

It should be noted that since R4 is not on the backward LSP, the reply will miss the echo request initiator if forwarded along the backward LSP only. With the mechanism handling echo replies with this new reply mode 5 defined at the end node of an LSP, R1 will then modify the destination FEC from 1.1/16 to 6.6/16 to make the reply being forwarded along the forwarding LSP towards R4. It also changes the return code in the return address TLV from 2 to 5. With the additional forwarding from R1 to R2, R2 to R3 and then R3 to R4, the echo reply will eventually reach its destination LSR R4.

R4 detects that the echo reply is intended for itself by checking the address TLV in the echo reply message. It then correlates this reply with the corresponding echo request and the original request completes with successful verification of the bidirectional LSP. It can detect the bypassing from the return code value. FIG. 8 shows partially the packet format for this case.

The present invention supports detection of connectivity from any to any other node along the LSP on bidirectional LSP, and the existing LSP ping mechanism does not support detection of connectivity from any to any other node on such bidirectional LSP, particularly, associated bidirectional LSP.

The present invention supports bidirectional LSP checks in a single operation which would either take two unidirectional LSP pings in the prior art, or might not even be feasible if the other end of a LSP belongs to a different domain/AS.

Furthermore, the mechanism of the present invention further allows any node in the LSP to initiate an echo request to any other node in bidirectional LSPs which cannot be achieved in the prior art. The any-to-any LSP ping mechanism allows each service provider of a MS-PW which spans across multiple service providers to test its segment separately.

Those skilled in the art can understand that the routers R1-R6 and R7-R8 and the like according to the present invention, shown in FIGS. 4-8 can be achieved by various functional modules performing the bidirectional LSP ping mechanism in the present invention. The so-called various modules can be achieved as software, hardware, firmware or some combinations of them. Moreover, a module can be achieved by a processor or a computer to execute commands of element functions. Some examples of the commands include software, program codes and firmware. When executed by a processor, the commands can guide, by operations, the processor to perform module functions. The commands can be stored at a storage device that is readable by the processor. Some examples of the storage device include digital or physical memory, magnetic storage medium, such as, disk or tape, hard disk or optically readable data storing medium.

Although specific embodiments are described here, the present invention is not limited to those specific embodiments. The scope of the present invention is defined by the following claims and any other equivalent forms.

The invention claimed is:

1. A method for checking connectivity between a first device and a second device on a bidirectional Label Switched Path (LSP), the method comprising:
sending an echo request from the first device to the second device, the echo request including,
a reply mode for requesting an echo reply to be delivered through a backward LSP, and
a return address that is a unique identifier (ID) of the first device;
receiving a first echo reply from the second device, if the first device is on a path of the backward LSP, the first echo reply including,
the unique ID of the first device, and
a return code related to a connectivity of the backward LSP;
receiving a second echo reply from an end device on the path of the backward LSP, if the first device is not on the path of the backward LSP, the end device receiving the echo request from the first device, the second echo reply including a modified version of the return code in the first echo reply; and
correlating the received first echo reply or the received second echo reply with the echo request at the first device to verify connectivity between the first and second devices on the bidirectional LSP.

2. The method as claimed by claim 1, wherein
each of the receiving the first echo reply and receiving the second echo reply receives the corresponding echo reply along the backward LSP if all the backward LSP exists; or
each of the receiving the first echo reply and receiving the second echo reply receives the corresponding echo reply along Internet Protocol (IP) routes if the backward LSP does not exist or the backward LSP is broken.

3. A method for checking connectivity between a first device and a second device on a bidirectional Label Switched Path (LSP), comprising:
receiving an echo request by the second device, from the first device, the echo request including a reply mode and a return address, the reply mode requesting an echo reply to be delivered through a backward LSP, and the return address being a unique identifier (ID) of the first device;
generating an echo reply in response to the echo request, the echo reply including,
the unique ID of the first device, and
a return code related to a connectivity of the backward LSP;
sending the echo reply to the first device if the first device is on a path of a backward LSP, the first device correlating the received echo reply with the echo request upon receiving the echo reply, and
sending the echo reply to an end node on the path of backward LSP if the first device is not on the path of the backward LSP, the end device modifying the return code to generate a modified echo reply, the first device receiving the echo reply from the second device or the modified echo reply from the end node and correlating the received echo reply or the modified echo reply with the echo request to verify connectivity between the first device and the second device on the bidirectional LSP.

4. The method as claimed by claim 3, wherein
the sending sends the echo reply along the backward LSP if the backward LSP exists; or
the sending sends the echo reply along internet protocol (IP) routes if the backward LSP does not exist or the backward LSP is broken.

5. An apparatus on bidirectional Label Switched Path (LSP), comprises:
a memory having computer readable instructions stored therein, and
a processor configured to execute the set of computer readable instructions to,
send an echo request to another device on the LSP, the echo request including,
a reply mode for requesting an echo reply to be delivered through a backward LSP, and
a return address that is a unique identifier (ID) of the apparatus;
receive a first echo reply from the other device, if the apparatus is on the path of the backward LSP, the echo reply including,
the unique ID of the apparatus, and
a return code related to a connectivity of the backward LSP;
receive a second echo reply from an end device on the path of the backward LSB, if the apparatus is not on the path of the backward LSP, the end device receiving the echo request from the apparatus, the second echo reply including a modified version of the return code of the first echo reply; and
correlate the received first echo reply or the received second echo reply with the echo request at the apparatus to verify connectivity between the first and second devices on of the bidirectional LSP.

6. An apparatus on a bidirectional Label Switched Path (LSP), comprises:
a memory having computer readable instructions stored thereon, and
a processor configured to execute the set of computer readable instructions to,
receive from another device on the LSP an echo request including a reply mode and a return address, the reply mode requesting an echo reply to be delivered through a backward LSP, and the return address being a unique identifier (ID) of the other-device; and generate an echo reply in response to the echo request, the echo reply including,
   the unique ID of the other device, and
   a return code related to connectivity of the backward LSP;
send the echo reply to the other device if the other device is on the path of the backward LSP, and
send the echo reply to an end node on the path of the backward LSP if the other device is not on the path of the backward LSP, the end device modifying the return code to generate a modified echo reply, the other device receiving the echo reply from the apparatus or the modified echo reply from the end node and correlating the received echo reply or the modified echo reply with the echo request upon receiving the echo reply to verify connectivity between the apparatus and the other device on the bidirectional LSP.

7. The apparatus claimed by claim 6, wherein,
the apparatus is configured to send the echo reply along the backward LSP if a backward LSP exists; or
the apparatus is configured to send the echo reply along Internet Protocol (IP) routes if the backward LSP does not exist or the backward LSP is broken.

* * * * *